May 30, 1967  F. BAUR  3,322,222
COMPENSATED ELECTROMAGNETIC BALANCE
Filed Nov. 12, 1964  3 Sheets-Sheet 1

INVENTOR
FRITZ BAUR

May 30, 1967 F. BAUR 3,322,222
COMPENSATED ELECTROMAGNETIC BALANCE
Filed Nov. 12, 1964 3 Sheets-Sheet 3

INVENTOR
FRITZ BAUR

United States Patent Office 3,322,222
Patented May 30, 1967

3,322,222
COMPENSATED ELECTROMAGNETIC
BALANCE
Fritz Baur, Denver, Colo.
(2275 Sharon Road, Menlo Park, Calif. 94025)
Filed Nov. 12, 1964, Ser. No. 410,490
7 Claims. (Cl. 177—210)

My invention concerns improvements in an instrument used to measure the mass of an object by comparing it to an electromagnetic force calibrated in terms of mass, an instrument that is sometimes called an electromagnetic balance. The invention increases the accuracy of measurement by at least one order of magnitude as compared against all presently used electromagnetic balances. This improvement is achieved by compensating for and thus eliminating several of the most serious measurement errors.

Figure 1:
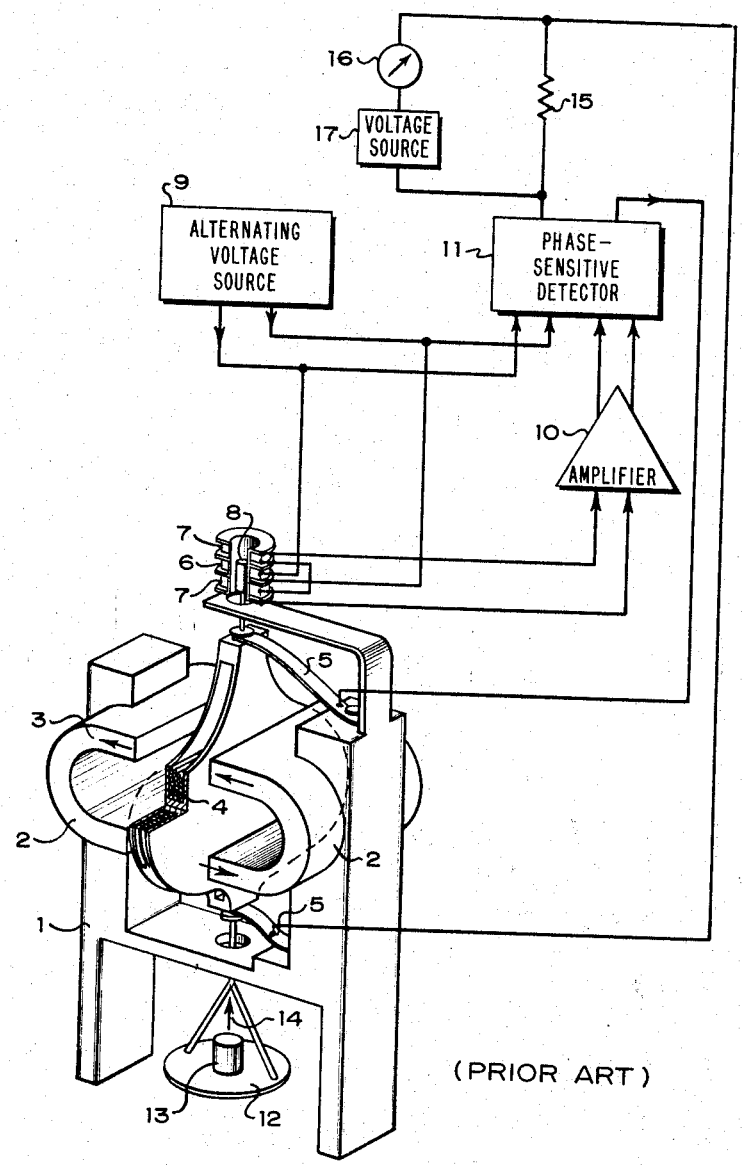
Figure 2:
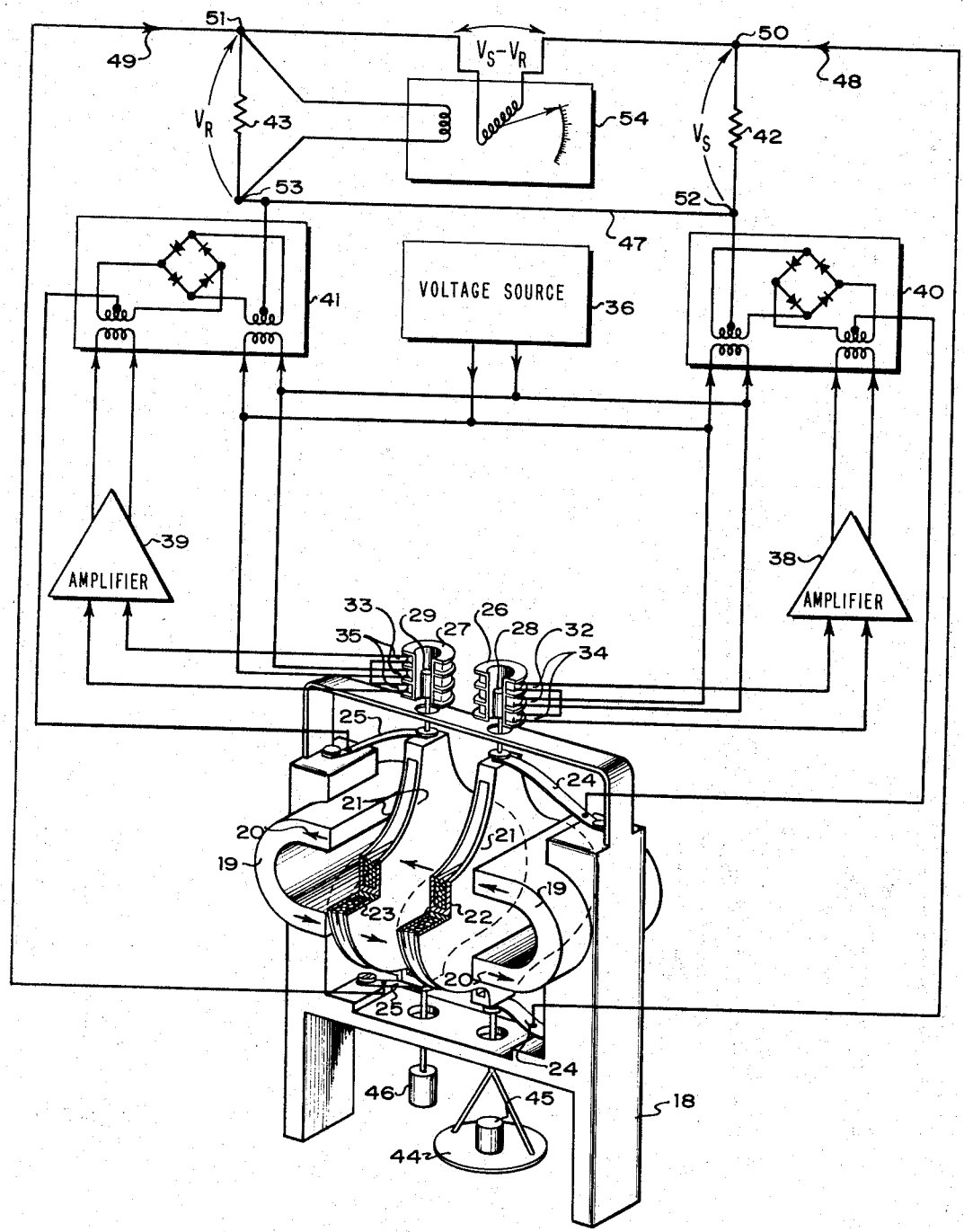
Figure 3:
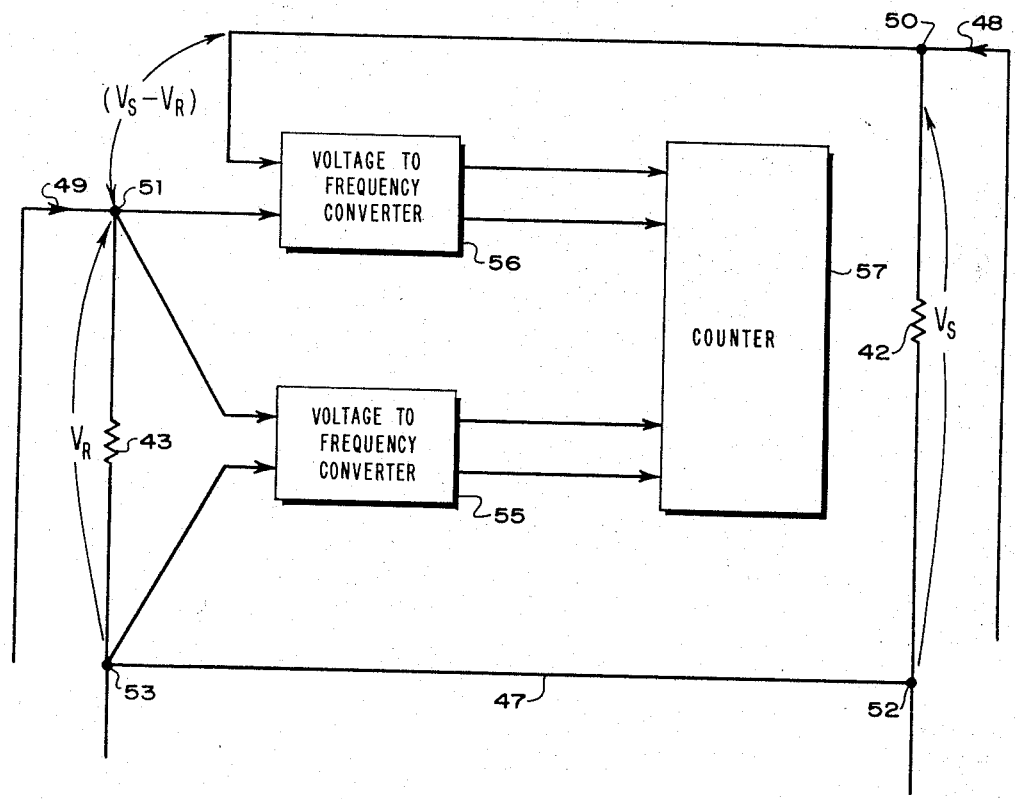

FIG. 1 is a perspective view and partial schematic of a typical, uncompensated electromagnetic balance and serves to explain the function of presently known balances. FIG. 1 is also used to explain how errors affect presently known balances. FIG. 2 is a perspective view and partial schematic of the preferred version of my invention. FIG. 3 is a partial schematic of a second version of my invention.

The following specifications are arranged in this order: explanation of function of known electromagnetic balances—explanation of how four error-sources affect the accuracy of known balances—description of my invention—explanation of how my invention compensates for the mentioned errors—detailed data of a specific embodiment of my invention.

1 is the structural frame supporting all parts, especially the permanent magnets 2, which create a magnetic field with horizontal lines of force 3. Coil 4 is positioned in the magnetic field and is shaped such that its wires are substantially horizontal in the area where they cross the magnetic field. Coil 4 is guided by two flat, highly flexible leaf-springs 5 that permit free vertical motion but restrict all sidewise motions. Springs 5 may also be used to carry current to coil 4. Coil 4 and magnets 2 may be shaped differently from what is shown but all configurations have in common that the magnetic lines of force as well as the coil-wires are substantially horizontal where they cross.

Displacement transducer 6 translates vertical coil motion into an electrical signal. Shown is a differential transformer with stationary windings 7 and a movable core 8. The primary winding is connected to alternating frequency generator 9. Any motion of core 8 will change the coupling coefficient between primary and secondary windings and will induce a voltage in the secondary winding which reflects the position of core 8.

Other displacement transducers may be used in place of the shown one, such as capacitive or photoelectric sensors. Essential is that all these devices transform the vertical displacement of coil 4 into an unambiguous and corresponding electrical signal.

This signal is amplified in amplifier 10 and rectified in phase-sensitive rectifier 11 if it is of alternating character. The ensuing D.C.-signal is connected to coil 4.

All this is well known, the function is as follows: The object 13 with unknown, to be measured mass is placed on balance pan 12 which is suspended from coil 4. The weight of coil and object will cause the moving system to drop down. This will cause a signal to appear at the output of transducer 6, which is amplified and rectified in amplifier 10 and rectifier 11 (if necessary) respectively and which will cause a D.C. current to flow in coil 4. The current will create an electromagnetic force 14 which follows the well-known elementary laws of electromagnetism i.e., it is perpendicular to both the coil-windings and the magnetic force-lines. With the postulated arrangement of coil and field force 14 will be vertical, directed upwards or downwards depending on the direction of the coil-current. All connections are selected properly such that a downwards motion of coil 4 results in an increasing, upwards-directed force 14.

At one point of the downwards motion of coil 4 the force 14 will be equal to the gross weight of coil 4 and all parts attached and supported by it, at which point the motion stops. The current in coil 4 thus becomes a measure of the gross weight. The entire, so-far described system is a simple servo-system that translates weight into an equivalent electromagnetic force. The current in coil 4 is a measure for the electromagnetic force 14 (all other things remaining unchanged) and is converted into a proportional voltage by placing a stable, known resistor 15 in series with coil 4. The voltage-drop across resistor 15 is connected to voltmeter 16.

The zero-condition of the instrument is defined as the condition with no object on pan 12. In this condition the coil has to support its own weight, the weight of the pan 12 and of the minor parts attached to it, which shall be called the tare-weight. This tare-weight is indicated on meter 16, but this is undesirable since it is not of interest. To suppress the indication of the tare-weight, voltage source 17 is connected in series with meter 16 and its voltage is selected to be equal and opposite in polarity to the voltage across resistor 15 in the zero-condition. In this way no net voltage will appear on meter 16 at zero-condition and the meter will indicate null as desired.

All previously known electromagnetic balances are seriously affected by errors from several sources, which limit their ultimate accuracy of measurement to no better than 0.01%. An uncompensated balance can, for example, weigh an object of 100 grams with an accuracy of only 10 milligrams. Such an accuracy is not sufficient for weighings as done in the course of chemical analysis or in many other, similarly exacting applications. Four specific error-sources are described in the following:

First: it is well known that the gravitational acceleration varies between points on the earth's surface by as much as 0.01%. This means that the weight of an object measured by an uncompensated electromagnetic balances varies by as much as 0.01% depending on where it is measured. It is the purpose of the balance, as defined in the opening paragraph, to measure the unvarying quality, namely the mass of an object and from the above it becomes apparent that to measure its weight instead is insufficient and inaccurate. This becomes even clearer when one visualizes the measurement to take place on a celestial body other than earth, for example on the moon. The gravitational acceleration on the moon is only about one-seventh the gravitational acceleration on earth and a measurement made with an uncompensated balance on the moon would therefore be in error by a factor of seven.

Second: it is well known that the field-strength of any permanent magnet, such as magnet 2, varies considerably with temperature and age of the magnet and is further affected by shock or vibration to which the magnet may be exposed. Field-strength variations cause errors in the electromagnetic balance, since a decrease in field-strength has to be made up by a corresponding increase of the current in coil 4 to arrive at the same electromagnetic force 14. Every change in magnetic field-strength reflects in a change in coil-current and leads to an erroneous indication on meter 16. Even a carefully made magnet can easily vary in field-strength by as much as 0.1% over periods of time as short as a few days.

Third: it is well known that uncompensated balances are affected by acceleration imparted to the balance, for example by vibrations transmitted to the balance from nearby machinery or by vibration transmitted through the air. The vertical component of such accelerations will add or subtract from the gravitational acceleration and will make the weight of the object 13 to appear to fluctuate in step with the vibration. The errors caused by this can be considerable: experience shows that they can be as high as 0.1% in unfavorable cases.

Fourth: it is well known that sidewise inclination of the uncompensated balance causes errors in measurement. This is because only the component of the weight coinciding with the direction of free motion of coil 4 has to be counteracted electromagnetically and only this component is measured. As long as the balance is set up in a vertical position the component measured is equal to the weight of the object, but as soon as the instrument is inclined sidewise the measured component is reduced in proportion to the cosine of the angle included by a vertical line and by the direction of motion of coil 4. This inclination error is 0.1% for an inclination of 2½ degrees. Such a small inclination-angle can easily be caused by sagging of the support upon which the balance is placed. If a weighing has to be done in some vehicle, such as on board an oceanographic research ship, the angle of inclination will continuously change and exact measurements are impossible.

All four listed error-influences lead to two distinct types of error. First, they cause the tare-weight to increase or decrease. In this case voltage source 17 can not fully cancel the voltage on resistor 15 and a zero-offset appears on meter 16. To allow for such an error, the operator would have to add or subtract the amount of the zero-offset from the indicated value on meter 16. This error shall therefore be called the additive error. Second, the mentioned error-influences will cause the weight of object 13 to increase or decrease in proportion to the amount of the objects weight. To allow for this error, the operator would have to multiply the value indicated on meter 16 with some correction factor. This error shall therefore be called the multiplicative error.

FIG. 2 shows a perspective view of the compensated, electromagnetic balance of my invention. Structural frame 18 supports all parts, especially magnets 19 which create a magnetic field 20 with essentially horizontal lines of force in air-gap 21 between their pole-faces. Placed into this field are two coils 22 and 23, that are shaped such that their windings have essentially horizontal wires in the area where they cross field 20. Coils 22 and 23 are guided by two flat, highly flexible leaf-springs each, 24 and 25 respectively, which permit free vertical motion but restrict any other motion. The leaf-springs carry the current to each coil.

26 and 27 are two displacement transducers of the differential transformer type. Their cores 28 and 29 are attached to and move with coils 22 and 23 respectively. The primary windings 32 and 33 of each transducer respectively are connected in parallel to one common alternating voltage source 36. The secondary windings 34 of transducer 26 are connected to amplifier 38 which, in turn, is connected to phase-sensitive rectifier 40. The reference input of rectifier 40 is connected to generator 36, the output is connected serially to coil 22 and resistor 42.

The secondary windings 35 of transducer 27 are connected to amplifier 39 which, in turn, is connected to phase-sensitive rectifier 41. The reference input of rectifier 41 is connected to generator 36, the output is connected serially to coil 23 and resistor 43. Suspended from coil 22 is a balance pan 44, upon which the object to be measured 45 is placed. Suspended from coil 23 is a reference object 46 with known, stable mass. The function of the parts described so far is similar to the function of the above-described, uncompensated, known balance: each of the two transducers 26 and 27 converts the vertical motion of its associated coil 22 and 23 respectively, into an electrical signal, each of which is amplified and rectified in its associated amplifier and rectifier. The output of each rectifier will cause a current to flow in the coil connected to it and these currents will each set up an electromagnetic force in its associated coil due to the well-known interaction of current-carrying conductor and magnetic field. The arrangement is such and all connections are selected such that the forces are directed vertically upwards and increase when the respective coil moves downwards.

The servo-action is similar to the one described earlier and will result in two electromagnetic forces that are each equal to the gross weight of their associated moving system.

The current in coil 22 will develop voltage $V_s$ across resistor 42, which is in proportion to the sum of the weights of coil 22, pan 44, transducer core 28, all minor parts attached to coil 22 and object 45 if such is placed on pan 44.

The current in coil 23 will develop voltage $V_r$ across resistor 43, a voltage proportional to the sum of the weights of coil 23, transducer core 29, all minor parts attached to coil 23 and the reference object 46.

We assume that the conventional current direction in each coil is as indicated by arrows 48 and 49, under this assumption point 50 will have a higher potential than point 52 and point 51 will have a higher potential than point 53.

The two lower-potential points 52 and 53 are electrically connected by connection 47 and are thus brought to the same potential. It is evident hat under these conditions the voltage between points 50 and 51 is the difference ($V_s - V_r$) between the voltages $V_s$ and $V_r$.

The values of resistors 42 and 43 are adjusted such that the voltages $V_s$ and $V_r$ are equal in the zero-condition, i.e.: when no object 45 is placed on pan 44. In this condition ($V_s - V_r$) will therefore be null. As soon as an object 45 is placed on pan 44, the current in coil 22 will increase due to servo-action until it again counteracts the increased weight. As a consequence $V_s$ will increase and ($V_s - V_r$) will assume a value in proportion to the weight of object 45.

54 is a D.C. voltage-ratio meter. As is well known, such a meter directly indicates the ratio between two voltages that are applied to its signal and reference inputs respectively. A bridge of the Wheatstone-type or a moving-coil meter with electromagnetic stationary field are two examples of ratio-meters and could be used. Preferably used is a digital, self-balancing D.C. voltage-ratio meter. Voltage-differential ($V_s - V_r$) is connected to the signal input, voltage $V_r$ is applied to the reference input of meter 54. The meter indicates the ratio R of the difference $V_s - V_r$ divided by $V_r$, which can be expressed by the following equation:

$$R = (V_s/V_r) - 1$$

In a second version of my invention, shown in FIG. 3, the D.C. voltage-ratio meter 54 is replaced by two voltage-to-frequency converters 55 and 56 and one pulse-counter 57. All other parts remain the same. Converter 56 transforms voltage $V_s - V_r$ as applied to its input to a frequency proportional to ($V_s - V_r$). Converter 55 is connected across resistor 43 and converts voltage $V_r$ into a proportional frequency.

The signal-input of counter 57 is connected to the frequency-output of converter 56, the gate-input is connected to converter 55. The gate-circuit of counter 57 is of the well-known nature: it lets pulses through to be counted and totalled for a time-period equal to a multiple of the pulse-periods applied to the gate-input. The higher the frequency applied to the gate-input, the shorter the counting-period and the lesser the number of totalled input-pulse will be and vice versa. This results in that the counts totalled by the counter are proportional to the ratio of the input frequency divided by the frequency applied to the gate-input. Since these frequencies are proportional to $(V_s-V_r)$ and $V_r$ respectively, the counter will indicate the ratio between the two said voltages in the same way as the D.C. voltage-ratio meter 54 does in the earlier described preferred version. The earlier given equation therefore applies equally to both versions of my invention, R being considered the indication on the meter or on the counter as the case may be.

I will now show how the four errors, as they are listed above, are compensated for and cancelled out in the compensated, electromagnetic balance as described:

First: the gravitational error. Assume as an example that the balance is used first in one location, then in another one with a 0.01% smaller gravity. Assume further that no object is on the pan 44. The tare weight of coil 22 then is 0.01% smaller in the second location, but the weight of coil 23 and the parts attached to it has also decreased by the same percentage. Voltages $V_s$ and $V_r$ are, as a consequence, both smaller, but by the same percentage. The ratio between them has not changed. Meter 54 will therefore still indicate null, the additive error is compensated. Now assume that an object 45 is placed on pan 44. $V_s$ will now be larger than $V_r$, but will be 0.01% smaller than it was at the first location. The value $(V_s-V_r)$ is smaller than at the first location, but so is $V_r$. Ratio R has not changed, the multiplicative error is also compensated.

Second: field-strength error. This error is compensated by the fact that both coils 22 and 23 cross the same, common field and that changes in the field-strength must necessarily affect both coils in the same proportion. If, for example, the field-strength decreases by 0.2% due to aging of magnet 19, then the current in both coils must increase by 0.2% to yield the same electromagnetic forces as before. Both currents increase in proportion, so do voltages $V_s$ and $V_r$. The ratio R is unchanged, and the indication on meter 54 does not change in spite of the change in magnetic field strength.

Third: vibration error. Accelerations stemming from vibrations reaching the balance from external sources must necessarily affect both moving systems by the same amount and in the same phase since both systems are connected to the same common structure 18. If accelerations increase or decrease the gross weight of one coil, they will do the same, and in the same proportion, to the other one. Voltages $V_s$ and $V_r$ will fluctuate with the fluctuations of the acceleration, but will retain the same ratio at all times. Meter 54 will not change in its indication, since as said before, it only responds to the ratio R.

Fourth: inclination error. It is obvious that any inclination will affect the entire balance, especially the two moving systems in the same amount since all parts are contained in one and the same structural frame 18. Leafsprings 24 and 25 guide coils 22 and 23 respectively in such a way that the two coils always stay parallel to each other. An inclination of the balance by, for example, 2½ degrees will reduce the force on coil 22 and $V_s$ both by 0.1%. The force on coil 23 and $V_r$ are, however, reduced by the same percentage since the inclination angle is the same for both coils. Ratio R remains unchanged.

In the last three error-discussions it was not explained in detail that both the additive as well as the multiplicative error are eliminated, but the analogy to the detailed discussion given for the gravitational error is evident.

To sum up the discussion of the error-rejection action in the compensated balance this generalized statement may be made: any error that affects the weights supported by coils 22 and 23 in the same proportion is rejected by the compensated balance. With pan 44 empty, coil 22 supports only its own tare weight. In this case the generalized statement reduces to a specialized statement: errors as defined above do not cause variations in the indication of the tare weight or, in other words, cause no additive error. With an object 45 on pan 44, coil 22 supports the gross weight of tare plus object. In this case the generalized statement reduces to a second specialized statement: errors as defined above do not cause changes in indication of the gross weight. This implies necessarily that errors as defined do not cause errors in the indication of the net weight or, in other words, cause no multiplicative error.

A compensated, electromagnetic balance was built. It was designed to measure objects with up to 200 grams mass. Structure 18 was about 16 inches high. Magnets 19 were made from Alnico-alloy and weighed about 5 pounds. The air-gap 21 was ⅜ inch wide and the magnetic field between the pole-faces had a cross-section of about 1½ by ½ inches. Coils 22 and 23 measured about 3½ inches length, 2 inches height and 5/32 inch thickness. Each coil was wound with 150 turns of insulated copper-wire. Transducers 26 and 27 were supplied with about 1 volt at 2400 c.p.s. by generator 36. The output voltage on each transducer was 1 millivolt for a core-displacement of 0.010 inch. Amplifiers 38 and 39 had 4 transistors each, one preamplifier, one driver and two push-pull connected power-output transistors each. The gain was such that 1 millivolt at the input created about 1 ampere output-current. The phase-sensitive rectifiers 40 and 41 were combined with the amplifier output stages by supplying alternating frequency from generator 36 as supply voltage to the respective output-stages in the well-known way. Coils 22 and 23 with all minor attached parts weighed about 100 grams each, pan 44 weighed 40 grams, the tare weight of coil 22 was therefore 140 grams. Reference object 46 was made, for convenience sake, to be 40 grams, such that the total weight supported by coil 23 was equal to the tare weight of coil 22.

The current necessary to support a weight of 140 grams was about 0.47 ampere in each coil. Resistors 42 and 43 were 30 ohms each, $V_s$ and $V_r$ with empty pan were therefore both about 14 volts. Placing 200 grams on pan 44 increased the current in coil 22 to 1.14 amperes and raised $V_s$ to 34 volts. $(V_s-V_r)$ was thus 20 volts for 200 grams or 1 volt per 10 grams.

Meter 54 was a commercially available, digital, 5-digit, voltage-ratio meter with a reproducibility and resolution of 0.001% and 50 microvolts respectively.

The error-compensation features of the balance were tested by first shunting the magnetic path of magnet 19 to simulate changes in field-strength, then by subjecting the balance to artificial vibration on a shaker-table, finally it was subjected to sidewise inclination of up to 10 degrees on an inclination-table.

It was not possible to subject the balance to different gravitational accelerations, but it stands to reason that the vibration-test is a valid substitute for this test, since there is basically no difference between accelerations as caused by gravitation or by vibration.

In all tests the indication on meter 54 changed less than 0.001% of its value, thus proving the soundness of the invention and establishing an improvement of at least a factor of ten in accuracy as compared with any previously known electromagnetic balance.

What is claimed is:
1. Electromagnetic apparatus comprising:
   means producing a magnetic flux field in a selected region;
   a signal conductor and a reference conductor each disposed within said selected region to move parallel to an axis in response to the interaction of the magnetic flux field in said region with electrical signals applied to said signal and reference conductors;
   means coupled to said signal conductor for exerting a force to be measured thereon in the direction parallel to said axis to alter the position thereof within the magnetic flux field;
   a transducer coupled to each of said signal and reference conductors for producing an output indicative of the position of the corresponding conductor in the magnetic flux field;

circuit means connected to each of said signal and reference conductors for applying a signal thereto with proper direction and with amplitude related to the output of the transducer coupled to the corresponding conductor for maintaining each of the signal and reference conductors in a selected position within the magnetic flux field; and means connected to said signal and reference conductors and responsive to the combination of the signals applied thereto for providing an indication of the force to be measured applied to said signal conductor.

2. Electromagnetic apparatus as in claim 1 wherein: said signal and reference conductors are each constrained to move only along a substantially vertical axis;

the means coupled to said signal conductor includes a pan for receiving an object the mass of which is to be determined; and a reference mass is coupled to said reference conductor, whereby the signals applied to said signal and reference conductors exert vertically-upward forces thereon tending to support the signal and reference conductors and elements coupled thereto.

3. Electromagnetic apparatus as in claim 1 wherein: said transducers include differential transformers each having a movable core with one core coupled to said signal conductor for movement therewith and the other core coupled to said reference conductor for movement therewith and each differential transformer having a plurality of circuit windings variably coupled together electromagnetically through its core;

a source of alternating signal is connected to corresponding circuit windings of said differential transformers for producing said output across other of the circuit windings of each of the differential transformers with an amplitude and phase relative to the alternating signal from the source that is related to the position of the core with respect to the circuit windings; and said circuit means includes a phase-sensitive detector for each of said signal and reference conductors, each of said detectors being connected to receive the alternating signal from said source and the output of a differential transformer for applying said signals to the corresponding signal and reference conductors with sufficient amplitude and direction to produce magnetomotive forces thereon which substantially equal and oppose the total forces exerted on the signal and reference conductors by the masses coupled thereto.

4. Electromagnetic apparatus as in claim 1 wherein: said circuit means includes a resistor for each of said signal and reference conductors; and means are connected to said resistors and are responsive to the voltage drops thereacross for producing an indication of the ratio of the signal currents applied to said signal and reference conductors.

5. Electromagnetic apparatus as in claim 1 wherein: the means for providing an indication includes a counter having an input and a gate having an input;

converter means connected to each of said signal and reference conductors for producing a time-varying output signal which varies at a rate related to the amplitude of current applied to the corresponding conductor;

means including said gate connecting one of the converter means to the input of said counter; and means connecting the other of the converter means to the input of said gate for enabling the same for a selected period related to the rate of time-variation of the output signal from the corresponding converter means, whereby the counter provides an indication of the ratio of currents supplied to said signal and reference conductors as the total count of time-varying output signals from one converter means passed by said gate during said selected period.

6. Electromagnetic apparatus as in claim 1 wherein: the last-named means includes a circuit for providing a first signal proportional to the difference between the signals applied to said signal and reference conductors and an element for providing an indication of the ratio of the first signal to one of the signals applied to said signal and reference conductors.

7. Electromagnetic apparatus as in claim 4 wherein: each of said resistors is serially connected to a corresponding one of the signal and reference conductors with corresponding end terminals of the resistors connected together; and ratio-indicating means having one input connected to receive the voltages on the remaining end terminals of said resistors and having another input connected to receive the voltage across one of said resistors for providing an indication of the ratio of voltages applied to the two inputs thereof.

References Cited
UNITED STATES PATENTS

| | | | |
|---|---|---|---|
| 2,602,660 | 7/1952 | Shannon | 177—210 |
| 2,631,027 | 3/1953 | Payne | 177—210 |
| 2,914,310 | 11/1959 | Bahrs | 177—210 |

RICHARD B. WILKINSON, *Primary Examiner.*

GEORGE H. MILLER, Jr., *Assistant Examiner.*